Figure 1:
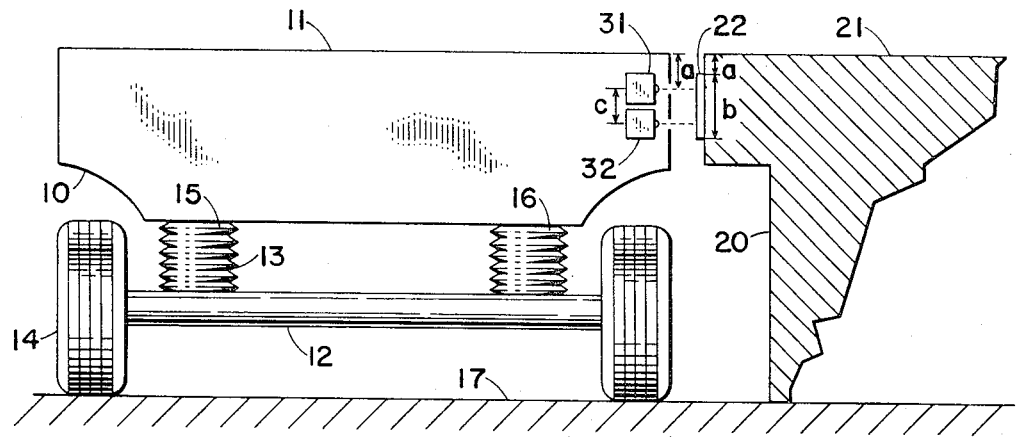

United States Patent [19]
Barber et al.

[11] 3,765,692
[45] Oct. 16, 1973

[54] LEVELING SYSTEM
[75] Inventors: Walter W. Barber, Venus; Kamil S. Kassess, Dallas; James M. Rushing, Arlington, all of Tex.
[73] Assignee: LTV Aerospace Corporation, Dallas, Tex.
[22] Filed: June 7, 1972
[21] Appl. No.: 260,575

[52] U.S. Cl............................ 280/6 R, 250/106 VC
[51] Int. Cl............................................. B60g 17/00
[58] Field of Search.................... 280/6 R, 6 H, 6.1, 280/6.11, 124 F; 250/106 VC

[56] References Cited
UNITED STATES PATENTS
2,620,435  12/1952  Vogt............................. 250/106 VC
1,990,798  2/1935   Richter........................... 280/6.1 X Primary Examiner—Philip Goodman
Attorney—Jack A. Kanz et al.

[57] ABSTRACT

Disclosed is apparatus for automatically adjusting the floor of a moving vehicle to the height of a loading dock or platform. The apparatus includes optical sensors positioned to detect light reflected from a reflective strip on the dock as the vehicle approaches the dock on a course parallel thereto. The signals generated by the sensors operate logic circuits to control the suspension system of the vehicle and adjust the height of the floor with respect to the reflective strip.

9 Claims, 2 Drawing Figures

Patented Oct. 16, 1973 3,765,692

LEVELING SYSTEM

This invention relates to automatic leveling apparatus for use in conjunction with wheeled vehicles. More particularly, it relates to apparatus for automatic elevational alignment of the floor of a mobile vehicle with a loading or unloading dock which parallels the track of the vehicle and which also automatically compensates for different loads on the vehicle. The apparatus ensures that the floor of the vehicle will be at a plane coincident with the level of the loading dock for transferring passengers or cargo between the vehicle and the dock when the vehicle is stopped at the terminal.

Many wheeled vehicles are operated on roadbeds or tracks which parallel a loading dock or platform whereby passengers or cargo may be transferred from the dock or vehicle through doors at the side adjacent the platform. Obviously, for convenience of loading and unloading the vehicle, it is desirable that the floor of the vehicle be aligned as closely as possible with the elevation of the floor of the platform. Many modern vehicles, however, are operated on pneumatic tires and include pneumatic suspension systems to provide smooth ride. Characteristically, the elevation of the floor of the vehicle from the roadbed may vary with various loading conditions of the vehicle. Therefore the floor of a heavily loaded vehicle may be below the level of the platform or a lightly loaded vehicle may be above the floor of the platform making the transfer of cargo or passengers between the vehicle and dock inconvenient. An analogous problem exists even when the vehicle is equipped with adjusting means for maintaining the vehicle at a constant height, if several of the platforms are of differing heights.

Various means have been devised to align the loading platform with the floor of the vehicle. For example, adjustable platforms or the like are sometimes used which may be manually operated to align the vehicle and platform floors after the vehicle has stopped at the platform. Such devices, however, are inconvenient since they are usually not automatically operated, causing delay in transferring passengers or cargo between the dock and the vehicle after the vehicle arrives at the terminal.

In accordance with the present invention apparatus is provided which automatically controls the suspension system on the vehicle as the vehicle approaches the platform on a track parallel thereto and automatically adjusts the height of the floor of the vehicle to coincide with the floor of the platform. Accordingly, when the vehicle comes to a stop adjacent the loading dock, the floor of the vehicle has already been adjusted to the elevation of the dock platform. The apparatus is substantially contained within the vehicle itself and utilizes optical means cooperating with reflective markers mounted on the sides of the loading platform to automatically control the suspension system of the vehicle as the vehicle approaches its destination on a track parallel with the loading platform. Thus, as the vehicle approaches the loading dock, the height of the vehicle floor is adjusted with respect to the markers on the dock. When the vehicle comes to rest along side the dock, the floor of the vehicle will be at the same height as the floor of the dock, regardless of loading conditions. Accordingly, the advantages gained through the use of pneumatic tires and pneumatic suspension systems may be employed without the usual attendant disadvantages of variable floor height under various loading conditions.

Figure 2:
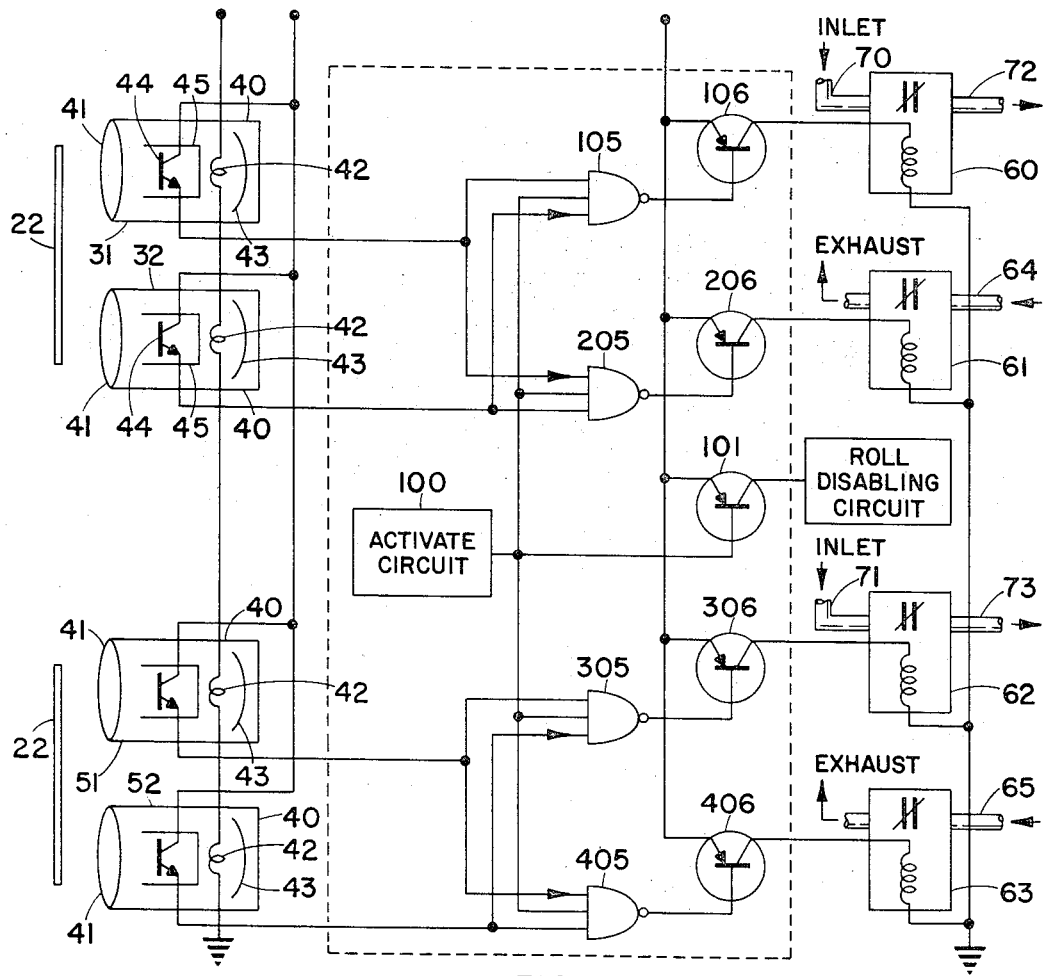

Other features and advantages of the invention will become more readily understood when taken in connection with the appended claims and attached drawings in which:

FIG. 1 is a diagrammatic elevational illustration of a vehicle and platform system employing the apparatus of the invention, and FIG. 2 is a schematic illustration of the apparatus of the invention.

For illustration purposes the invention will be described hereinafter with reference to a four-wheeled vehicle utilizing a pneumatic suspension system as diagrammatically illustrated in FIG. 1. It will be readily appreciated, however, that the principles of the invention are not so limited and may be applied to various other vehicles adapted to travel on a roadbed, track or guideway parallel a loading dock or platform.

As illustrated in FIG. 1 the vehicle basically comprises a framework 10 supporting a floor 11 suspended between front and rear axles 12 by means of a suitable suspension system. As illustrated in FIg. 1 the suspension system is preferable a pneumatic system including air bellows 15, 16 between the axle 12 and frame 10 which, in cooperation with pneumatic tires 14, provide a smooth and vibration-free ride. In the system illustrated the vehicle travels on a roadbed 17 which may include a guide means (not illustrated) for automatically guiding the course or track of the vehicle as it approaches the platform or dock 20.

Vehicle systems of the type generally described are used for rapid mass transit of both passengers and cargo. In such rapid transit systems the loading conditions of the vehicle may vary when used for either passengers or cargo. Conventionally, pressure and volume of air in the pneumatic system is automatically controlled to provide the most stable and smooth ride under various loading onditions. It will be readily appreciated, however, that under heavy loading conditions the suspension system will allow the floor of the vehicle to be at a lower elevation than under lighter loading conditions.

In accordance with the present invention apparatus is provided which automatically raises or lowers the floor 11 of the vehicle to coincide with the level of the dock floor 21 as the vehicle approaches its destination on a track or course parallel with the loading dock. The apparatus operates in conjunction with the suspension system utilized in the vehicle and is responsive to optical sensing means mounted on the vehicle which is operatively interconnected with the suspension system to raise or lower the vehicle floor to a predetermined level by varying pressure and volume of air in the suspension bellows.

As illustrated in FIG. 1 a strip of optically reflective material 22 of finite width "b" is positioned along the face of the dock adjacent the track of the vehicle at a predetermined distance "a" from the floor of the platform. A pair of optical sensors, indicated at 31 and 32, are mounted on the side of the vehicle to travel along a course parallel to the side of the dock and are aimed at the reflective strip 22. The sensors 31 and 32 are preferably mounted one above the other, the upper sensor 31 being positioned below the floor 11 of the vehicle a distance at least as great as the distance "a" described hereinabove.

The lower sensor 32 is positioned below the first sensor 31 at a distance "c" which is no greater than the width "b" of the reflective strip 22.

An optical source (preferably included within the sensors 31 and 32) is mounted to direct a light beam toward the side of the dock and strip 22 from the vehicle. The side of the dock surrounding the tape 22 is preferably coated with a non-reflective or low reflectivity paint or other substance so that a distinct signal will be reflected from the light source to the sensors 31 and 32 when the sensors and optical sources are aligned horizontally with any portion of the reflective strip 22. It will thus be observed that when the floor 11 of the vehicle is aligned with the floor 21 of the platform, reflected signals of equal strength will be received by both sensors 31 and 32. However, if the floor 11 of the vehicle is below the floor 21 of the platform only the upper sensor 31 will receive a reflected signal. Conversely, if the floor 11 of the vehicle is above the level of floor 21 of the dock, only the lower sensor 32 will receive a reflected signal. Therefore the difference in the signals received by the sensors may be used to determine the position of the floor of the vehicle 11 with respect to floor 21 of the platform.

Logic circuit means interconnected with the output of the sensors as illustrated in FIG. 2 operate to translate the signal differences into inputs for activating mechanisms for controlling the volume and pressure of air in the pneumatic suspension system, thereby adjusting the height of the floor of the vehicle to the height of the dock.

The preferred embodiment of the apparatus of the invention is schematically illustrated in FIG. 2. The apparatus illustrated in FIG. 2 contemplates the use of a pair of sensors 31 and 32 at the forward end of the vehicle and a second pair of sensors 51 and 52 located at the opposite end of the vehicle. The sensors may be used in connection with a single strip of reflective tape 22 which is at least as long as the vehicle or individual strips, each about 6 to 12 feet long and about 2 to 5 inches wide. In the preferred embodiment the sensors 31, 32, 51 and 52 are substantially identical and include a housing 40 and a lens 41. Disposed within the housing 40 is a lamp 42 and retroreflective mirror adapted to direct light from the lamp 42 through the lens 40 toward the reflective tape 22. A photosensitive device 44, such as phototransistor, is mounted within the housing and shielded from the lamp 42 by a shield 45. It will thus be observed that optical energy from lamp 42 will be directed horizontally through the lens 41 toward the tape 22 and reflected by strip 22 back through the lens 41 onto the photosensitive device 44 only when the tape 22 is horizontally aligned with the sensor. Various types of combination optical source and sensors of the type generally described are commercially available and may be satisfactorily employed in the apparatus described.

The output from each of the sensors is operatively interconnected with a logic network which operates on the signal received from the sensors to control pneumatic valves 60, 61, 62 and 63.

Pneumatic valves 60 and 62 are normally closed valves having inlets 70 and 71 in fluid communication with a source of pressurized air. The outlets 72 and 73 are in fluid communication with the pneumatic bellows (illustrated at 15 and 16 in FIG. 1) of the suspension systems of the front and rear axles respectively. Accordingly, when valve 60 is open pressurized air will be admitted to the front suspension system raising the front of the vehicle. Likewise, when valve 62 is opened pressurized air will be admitted into the rear suspension system raising the rear of the vehicle.

Valves 61 and 63 are normally closed pneumatic valves each having inlets 64 and 65, respectively, in fluid communication with the front and rear pneumatic suspension systems, respectively, and their outlets open to atmosphere. It will thus be observed that when valve 61 is opened air will be allowed to escape from the front suspension system. Likewise when valve 63 is opened air will be allowed to escape from the rear suspension system, thus lowering the vehicle.

In many vehicles of the type generally described herein the pneumatic suspension system includes a lateral roll compensating mechanism to prevent roll-induced sway in the vehicle resulting from uneven pressures in the air bellows 15 and 16. Since the leveling apparatus of this invention is intended to operate only near the loading dock while the vehicle is travelling at relatively low speeds, it may be necessary or desirable to disable the roll compensating mechanism so that air injected into or withdrawn from the pneumatic suspension system will affect both sides of the vehicle uniformly. Furthermore, since the height adjusting mechanism of the invention is intended for operation only as the vehicle nears the dock, it is preferable that the system not be activated until the vehicle is approaching its destination. Also since the leveling apparatus is responsive to optical signals received by sensors 31, 32, 51 and 52, it is preferable that the system by inactivated until the sensors are located within the vicinity of the reflective strips 22. Accordingly, as illustrated in FIG. 2 the apparatus may include an activating circuit 100 which supplies power to the logic circuit and simultaneously triggers a power switch 101 operative to disable the roll control mechanism. The activation circuit may be activated by any of many activating means such as locater beacon, trip switches, timers, etc., or manually operated as desired.

The logic network comprises a NAND gate 105 and power switch 106 operatively interconnected between the output of the upper sensor 31 and pneumatic valve 60.

A second NAND gate 205 and power switch 206 are operatively interconnected between the output of the lower sensor 32 and the pneumatic valve 61 as illustrated in FIG. 2. The output of the upper sensor 31 is also operatively interconnected with the NAND gate 205 by means of an inverter and the output of the lower sensor 32 connected to the input of the first NAND gate 105 by means of an inverter. It will be understood, however, that the suitable buffering circuits (not shown) may be used between the output of the sensors and the logic network as required. Accordingly, as illustrated in FIG. 2, when reflected signals of approximately equal strength are received by both sensors 31 and 32, neither gate 105 nor gate 205 will operate to turn on either power switch 106 or 206 and the valves 60 and 61 remain closed. However, if sensor 32 is below the level of reflective strip 22 the signal received from the upper sensor 31 will be quite strong relative to the signal received from the lower sensor 32. Accordingly, the signal received by NAND gate 105 will be greater than the signal received by NAND gate 205 and power switch 106 will be turned on to open valve 60 and admit pressurized air into the suspension system through inlet 70. When the vehicle is raised to point where both sensors 31 and 32 receive approximately equal reflective signals, power switch 106 will be turned off and inlet 70 closed. Conversely, if upper sensor 31 is above the reflective strip 22 the output signal of the lower sensor 32 will be stronger than the signal from sensor 31 and exhaust valve 61 will be opened to release air from the pneumatic suspension system, thereby lowering the vehicle until signals of equal strength are received from sensors 31 and 32.

Similarly a duplicate system is positioned at the opposite end of the vehicle comprising sensors 51 and 52, NAND gates 305 and 405 and power switches 306 and 406 to adjust the height of the other end of the vehicle.

It will be readily appreciated that many various optical systems may be employed in the apparatus described. Where highly precise elevational alignment is required, collimated optical beams or lasers may be employed. Other suitable means will become apparent to those skilled in the art to satisfy specific requirements while employing the principles of the invention.

While the invention has been described with reference to use in a vehicle having a pneumatic suspension system, it should be understood that the invention may also be employed in vehicles having other types of suspension systems. For example, the pneumatic valves 60, 61, 62, 63 may be replaced by valves controlling hydraulic actuator means (not shown) for adjusting the height of a vehicle having other types of suspension systems or for controlling the level of fluid within elements of a hydraulic/pneumatic suspension system.

It is to be understood that although the invention has been described with particular reference to specific embodiments thereof, the forms of the invention shown and described are to be taken as the preferred embodiments of same, and that various changes and modification may be resorted to without departing from the spirit and scope of the invention as defined by the appended claims.

What is claimed is:

1. In a system including a vehicle adapted to move substantially parallel to a fixed platform, apparatus for vertically aligning the floor of said vehicle with the floor of said platform comprising
   a. reflective means of finite width positioned on the side of said fixed platform at a predetermined distance from the floor of said platform and substantially parallel to the track of said vehicle,
   b. an optical source mounted on the side of said vehicle facing said platform and positioned at substantially an equal predetermined distance from the floor of said vehicle,
   c. a pair of detectors sensitive to the wavelength of said optical source mounted on the side of said vehicle facing said platform, said detectors being substantially vertically arranged with respect to each other and separated by a distance not greater than said finite width of said reflective means, the upper one of said detectors being positioned on said vehicle at a distance from the floor thereof which is at least as great as the distance from the floor of said platform to the top of said reflective means,
   d. means for moving the floor of said vehicle vertically, and
   e. circuit means responsive to the signals generated by said detectors and operative to activate said means for moving the floor of said vehicle vertically.

2. Apparatus as defined in claim 1 wherein said vehicle includes a pneumatic suspension system and said means for moving the floor of said vehicle vertically includes
   a. a source of pressurized air in fluid communication with said pneumatic suspension system through a first normally closed valve,
   b. vent means for releasing air from said pneumatic suspension system through a second normally closed valve, and
   c. logic means responsive to the difference in signals generated by said detectors and operative to open said first normally closed valve only when the signal generated by the upper one of said detectors is greater than the signal generated by the lower one of said detectors, and to open said second normally closed valve only when the signal generated by the lower one of said detectors is greater than the signal generated by the upper one of said detectors.

3. Apparatus as defined in claim 2 wherein said logic means includes first and second NAND gates operatively controlling first and second power switches, respectively, the output of said upper detector operatively connected to an input of said first NAND gate and also connected with an input of said second NAND gate through an inverter; the output of said lower sensor operatively connected with an input of said second NAND gate and also connected with an input of said first NAND gate through an inverter.

4. Apparatus as defined in claim 1 including means for activating said circuit means only when said vehicle is in the immediate vicinity of said platform.

5. Apparatus as defined in claim 4 wherein said vehicle includes a pneumatic suspension system and roll control apparatus automatically adjusting pneumatic suspension pressure to avoid roll-induced sway, said apparatus including means for operatively disabling said roll control apparatus simultaneously with activation of said circuit means responsive to the signals generated by said detectors.

6. Apparatus as defined in claim 1 wherein said vehicle includes a pneumatic suspension system supporting the vehicle body over a pair of axles and said means for moving the floor of said vehicle comprising valves responsive to said circuit means for varying the volume of air in said pneumatic suspension system.

7. The apparatus defined in claim 1 wherein said circuit means includes a logic network responsive only to the difference in signals generated by said pair of detectors.

8. The apparatus defined in claim 7 wherein said logic network comprises a NAND gate operatively interconnected with the output of each of said detectors, each gate being operatively connected with a power switch and interconnected with each other to turn on the respective power switch connected therewith only when the signal received from the detector connected therewith is greater than the signal received by the other gate from the other detector.

9. In a system including a wheeled vehicle having a floor supported between front and rear axles by a pneumatic suspension system and adapted to move along a course substantially parallel to a fixed platform; apparatus for vertically aligning the floor of said vehicle with the floor of said platform comprising a. reflective means of finite width positioned on the side of said fixed platform at a predetermined distance from the floor of said platform and substantially parallel to the course of said vehicle,
b. means for reflecting optical energy from said reflective means substantially horizontally across the path of said vehicle,
c. first upper and lower sensors mounted on said vehicle near the front thereof and aligned to detect optical energy transmitted across the path of said vehicle, the upper sensor being positioned on said vehicle at a vertical distance from the floor thereof which is at least as great as said predetermined distance and vertically separated from said lower sensor by a distance not greater than said finite width of said reflective means,
d. means for selectively injecting and releasing air from the front and rear pneumatic suspension systems whereby the height of the front and rear of said vehicle may be varied,
e. circuit means responsive to the difference in signals generated by said first upper and lower sensors and operative to control said means for selectively injecting and releasing air from said front pneumatic system,
f. second upper and lower sensors mounted on said vehicle near the rear thereof and aligned to detect optical energy transmitted across the path of said vehicle, the upper sensor being positioned on said vehicle at a vertical distance from the floor thereof which is at least as great as said predetermined distance and vertically separated from said lower sensor by a distance not greater than said finite width of said reflective means, and
g. circuit means responsive to the difference in signals generated by said second upper and lower sensors and operative to control said means for selectively injecting and releasing air from said rear pneumatic suspension.

* * * * *